(12) United States Patent
Bonacini

(10) Patent No.: US 10,661,619 B2
(45) Date of Patent: May 26, 2020

(54) MACHINE FOR FITTING AND REMOVING WHEEL TYRES FOR VEHICLES

(71) Applicant: Giuliano Group S.p.A., Correggio (RE) (IT)

(72) Inventor: Maurizio Bonacini, Correggio (IT)

(73) Assignee: Giuliano Group S.p.A., Correggio (IT)

( * ) Notice: Subject to any disclaimer, the term of this patent is extended or adjusted under 35 U.S.C. 154(b) by 535 days.

(21) Appl. No.: 15/081,951

(22) Filed: Mar. 28, 2016

(65) Prior Publication Data

US 2016/0288598 A1 Oct. 6, 2016

(30) Foreign Application Priority Data

Apr. 3, 2015 (IT) .................................. MO15A0077

(51) Int. Cl.
*B60C 25/05* (2006.01)
*B60C 25/138* (2006.01)

(52) U.S. Cl.
CPC ...... *B60C 25/0554* (2013.01); *B60C 25/0548* (2013.01); *B60C 25/138* (2013.01); *B60C 25/0527* (2013.01)

(58) Field of Classification Search
CPC ............ B60C 25/0551; B60C 25/0548; B60C 25/0554
See application file for complete search history.

(56) References Cited

U.S. PATENT DOCUMENTS

| 2,900,018 A * | 8/1959 | Harrison | B60C 25/132 |
| | | | 157/1.24 |
| 8,276,641 B2 * | 10/2012 | Matteucci | B60C 25/138 |
| | | | 157/1.24 |
| 8,342,223 B2 * | 1/2013 | Sotgiu | B60C 25/135 |
| | | | 157/1.24 |

(Continued)

FOREIGN PATENT DOCUMENTS

| EP | 2110270 | 10/2009 |
| EP | 2181867 | 5/2010 |

OTHER PUBLICATIONS

"Corghi Artiglio Mastercode—Procedura Automatica" video, published Mar. 25, 2013; https://www.youtube.com/watch?v=vccn2X45Ezw.*

(Continued)

*Primary Examiner* — Bryan R Muller

(57) ABSTRACT

The machine (1) for fitting and removing wheel tyres for vehicles comprises a bearing structure (2), an attachment and rotation arrangement (4) of the rim (C) of a wheel (R) for vehicles, a tool-holder assembly (5) movably associated with the bearing structure (2) and having at least a tool (8, 9, 10) for removing and/or fitting a tyre (P) from/onto the rim (C), an adjustment arrangement (11, 12) able to adjust the relative position between the tool-holder assembly (5) and the rim (C), to place the tool-holder assembly (5) in an optimal operating position wherein the tool (8, 9, 10) is operable to remove and/or fit a tyre (P), and a visual signaling assembly (13, 14) of said optimal position having (Continued)

at least an emitter (13, 14) of a light beam (L1, L2), the optimal operating position being defined when the point of incidence of the light beam (L1, L2) on the wheel (R) coincides with an external point of the edge of the rim (C).

11 Claims, 10 Drawing Sheets

(56) References Cited

U.S. PATENT DOCUMENTS

2008/0123107 A1\* 5/2008 Sotgiu ................. B60C 25/0554
356/601

OTHER PUBLICATIONS

"Corghi Artiglio Mastercode—Procedura Automatica" video, published Mar. 25, 2013; https://www.youtube.com/watch?v=vccn2X45Ezw (Year: 2013).\*

Rapporto di Ricerca e Opinione Scritta [Search Report and Written Opinion] dated Dec. 1, 2015 from the Direzione Generale Sviluppo Produttivo e Competitivita, Ufficio Italiano Brevetti e Marchi Re. Application No. ITMO20150077.

Corghi S.p.A. "Corghi Artiglio Mastercode—Procedura Automatica", Youtube, Mar. 25, 2013. The Video Shows the Automatic Demounting and Mounting of the Tyre. The Automatic Positioning of the Tool Holder is Done Using a Laser Beam and Shown Between 15 and 26 Seconds of the Video.

\* cited by examiner

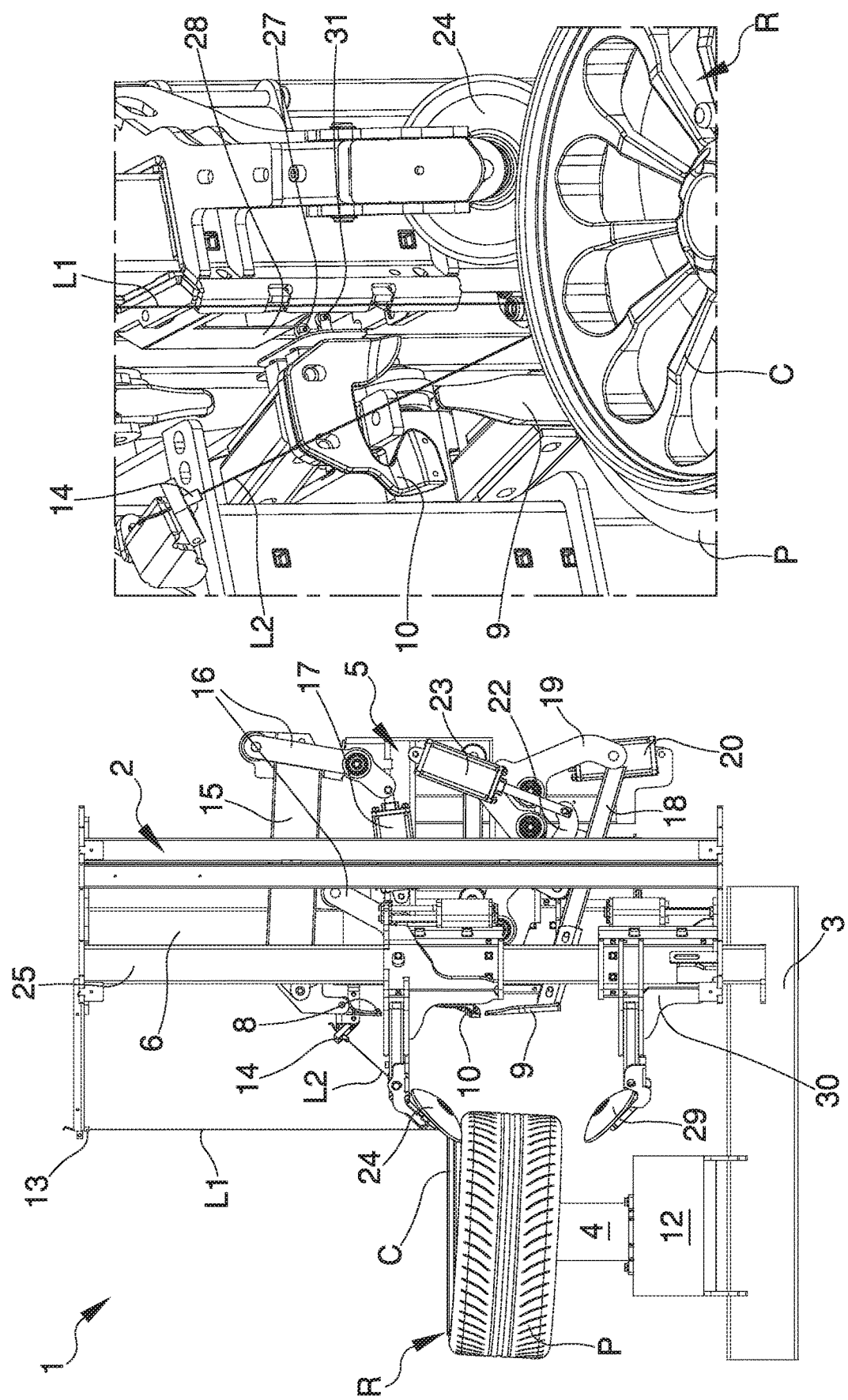

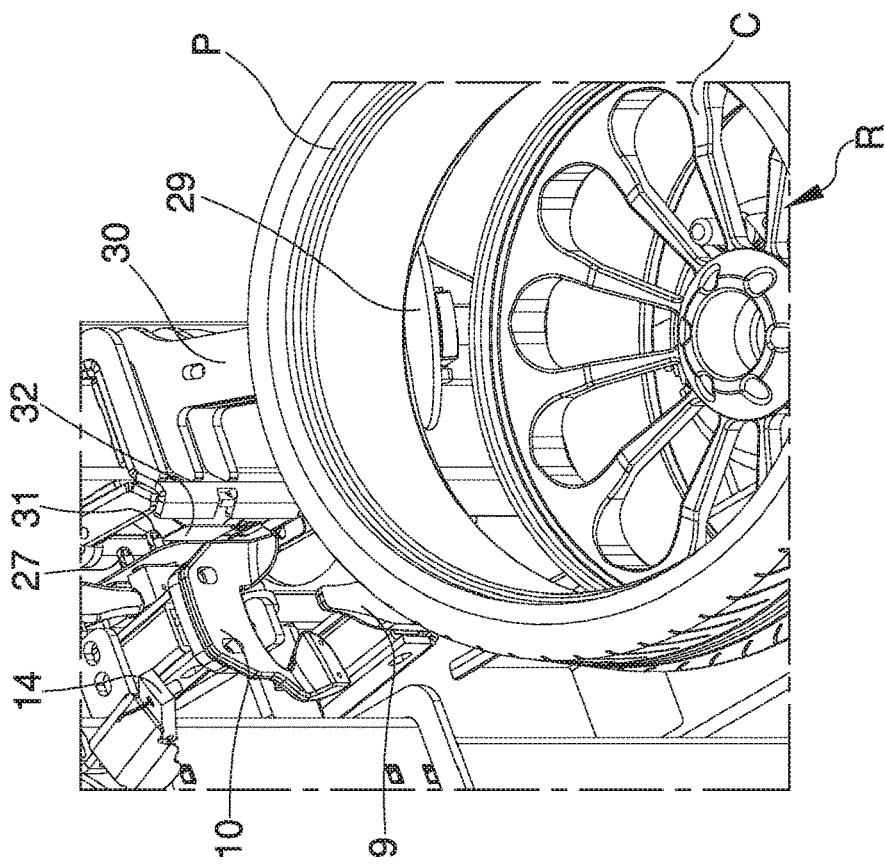
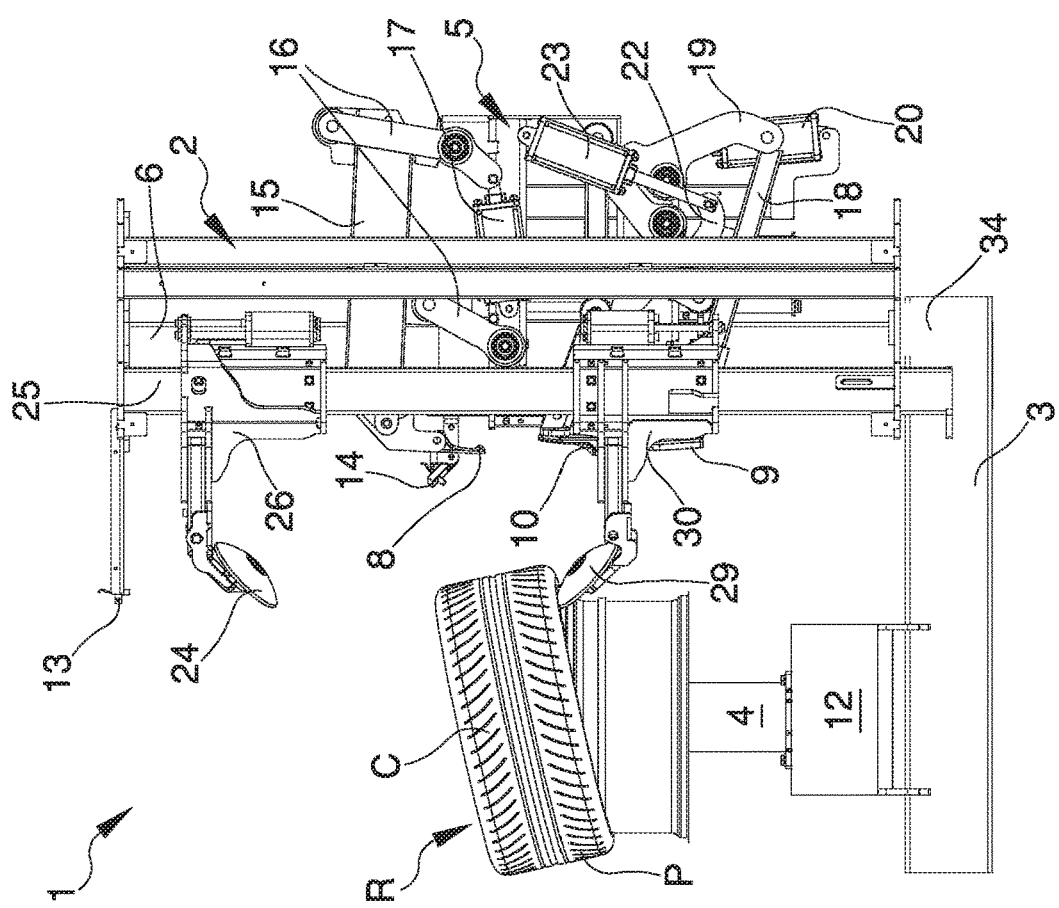

MACHINE FOR FITTING AND REMOVING WHEEL TYRES FOR VEHICLES

RELATED APPLICATIONS

This application claims the benefit of priority of Italian Patent Application No. MO2015A000077 filed Apr. 3, 2015, the contents of which are incorporated herein by reference in their entirety.

FIELD AND BACKGROUND OF THE INVENTION

The present invention relates to a machine for fitting and removing wheel tyres for vehicles.

It is known that vehicle wheels generally comprise a metal rim having, along its perimeter, annular flanges among which are inserted in tight abutment the end portions, so-called "beads", of an elastic tyre.

The use of machines is currently known, so-called "tyre-changing machines", able to remove and fit the tyre from the relevant rim e.g. for running maintenance, repair or replacement jobs.

Different types of tyre-changing machines of the automatic type are particularly known which generally comprise a base having an attachment and rotation arrangement for attaching and rotating a wheel, one or more supporting uprights which rise vertically from the base, a tool-holder assembly associated with the upright and movable in translation at a height and horizontally, either manually or by the action of respective actuators, having one or more tools for removing the tyre.

One of the removal tools commonly has a curved end part and is used to grasp the tyre bead and to lift and take it off above the annular flange of the rim. Other tools, generally supported by suitable auxiliary arms, are used to assist the operator during all the tyre fitting and removal operations.

The tyre-changing machines of known type have, however, some drawbacks.

In fact during use, the operator uses different tools intended for bead breaking, extraction and positioning of the tyre bead from/onto the rim edge, the removal or positioning of the tyre from/onto the rim.

This necessarily entails a continuous manual adjustment by the operator of the position of these tools depending on the specific dimensions of the wheel, resulting in considerable lengthening of the overall fitting/removal times.

Moreover, the need to carry out such continuous manual adjustment increases the chances of a positioning error by the operator, with the consequent possibility of damaging the tyre and the rim.

SUMMARY OF THE INVENTION

The main aim of the present invention is to provide a machine for fitting and removing wheel tyres for vehicles which considerably reduces the time required for adjusting the position of the tools depending on the dimensions of the wheel.

Another object of the present invention is to provide a machine for fitting and removing wheel tyres for vehicles that allows to considerably reduce the risk of damaging the rim or the tyre.

Another object of the present invention is to provide a machine for fitting and removing wheel tyres for vehicles that allows to overcome the mentioned drawbacks of the prior art within the ambit of a simple, rational, easy and effective to use as well as affordable solution.

BRIEF DESCRIPTION OF THE SEVERAL VIEWS OF THE DRAWINGS

The aforementioned objects are achieved by the present machine for fitting and removing wheel tyres for vehicles according to the characteristics described in claim 1.

Other characteristics and advantages of the present invention will become better evident from the description of a preferred, but not exclusive, embodiment of a machine for fitting and removing wheel tyres for vehicles, illustrated by way of an indicative, but non-limiting, example in the accompanying tables of drawings, in which:

FIGS. 4, 5, 6, 7, 8, 9, 10 and 11 illustrate the operation of the machine according to the invention during an operation of removing a tyre from its rim;

DESCRIPTION OF SPECIFIC EMBODIMENTS OF THE INVENTION

Figure 1:
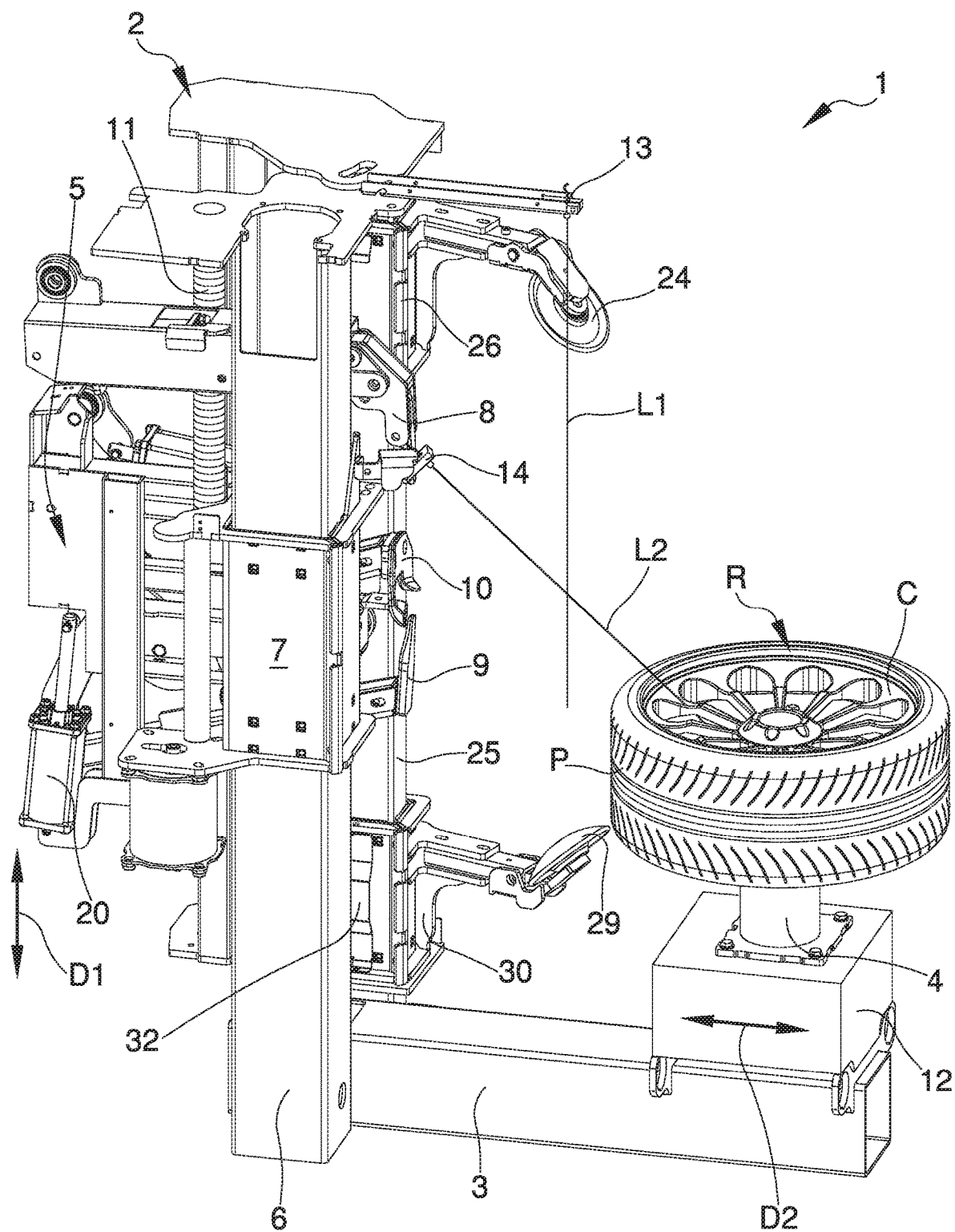
FIGS. 1, 2 and 3 are axonometric views illustrating the positioning of a tool-holder assembly of the machine according to the invention in an optimum operating position.

With particular reference to such figures, reference number 1 globally indicates a machine for fitting and removing wheel tyres for vehicles.

The machine 1 comprises a bearing structure 2 which has a base 3 positionable resting on the ground and extending vertically upwards.

The machine 1 also comprises attachment and rotation arrangement 4 supported by the base 3 and able to lock and to cause the rotation of the rim C of a wheel R for vehicles. For example, such attachment and rotation arrangement 4 can be composed of a special locking spindle of the rim C.

A tool-holder assembly 5 is supported by the bearing structure 2 and is movable close to and away from the spindle 4. In particular, the tool-holder assembly 5 is associated with a first vertical upright 6 of the bearing structure 2 by means of a first carriage 7 vertically sliding.

Usefully, with particular reference to a preferred embodiment illustrated in the figures, the tool-holder assembly 5 has three distinct tools 8, 9 and 10 employable for the removal and/or fitting of a tyre P from/onto the rim C.

In particular, the tool-holder assembly 5 comprises a first tool 8 for extracting an upper bead of the tyre P from the respective upper edge of the rim C, a second tool 9 for fitting a bottom bead of the tyre P onto the rim C, and a third tool 10 for fitting the upper bead of the tyre P onto the respective upper edge of the rim C.

The use of a tool-holder assembly 5 with a different number and/or different kind of tools cannot however be ruled out.

The machine 1 also comprises an adjustment arrangement 11, 12 able to adjust the relative position between the tool-holder assembly 5 and the rim C fitted on the spindle 4, in order to place the tool-holder assembly 5 in an optimal operating position wherein the tools 8, 9 and 10 are operable to remove and/or fit a tyre P.

In particular, with reference to the preferred but not exclusive embodiment illustrated, the adjustment arrangement 11, 12 comprises a first device 12 of the spindle 4 along a first direction D1 of approaching/moving away with respect to the tool-holder assembly 5. In particular, the first movement device 12 moves the spindle 4 along a first horizontal direction D1.

Furthermore, the adjustment arrangement 11, 12 comprises a second movement device 11 of the tool-holder assembly 5 along a second direction D2, substantially transverse to the first direction D1, of approaching/moving away with respect to the spindle 4. In particular, such second movement device 11 moves the tool-holder assembly 5 on the first upright 6, along a second vertical direction D2 and can be composed of, e.g., an appropriate worm screw movement system able to allow a precise and stable positioning during all the fitting and removal operations.

Advantageously, the machine 1 comprises a visual signaling assembly 13, 14 enabling a simple and rapid identification of the aforementioned optimal position by an operator.

In particular, such visual signaling assembly 13, 14 comprises a first emitter 13 substantially turned towards the spindle 4 and able to emit a first light beam L1 along a first predefined direction, and a second emitter 14 substantially turned towards the spindle 4 with an angle different to the first emitter 13 and able to emit a second light beam L2 along a second predefined direction.

Advantageously, during use, the aforementioned optimal position of the tool-holder assembly 5 is identified when the respective points of incidence of the first light beam L1 and of the second light beam L2 on the wheel R coincide with respective external points of the upper edge of the rim C.

In particular, with reference to the preferred embodiment illustrated in the figures, the first direction of the first light beam L1 is substantially vertical, while the second direction of the second light beam L2 is substantially inclined.

Moreover, still with reference to the preferred embodiment illustrated in the figures, the first emitter 13 is fixed to the bearing structure 2, while the second emitter 14 is fixed to the tool-holder assembly 5.

In particular, the first emitter 13 is fixed to an upper portion of the bearing structure 2, while the second emitter 14 is fixed to a special bracket made on the first carriage 7 which carries the tool-holder assembly 5.

Preferably, the first emitter 13 and the second emitter 14 are the type of laser emitters able to emit a first laser beam L1 and a second laser beam L2, respectively.

The tool-holder assembly 5 comprises an operating assembly 15, 16, 17, 18, 19, 20, 21, 22 and 23 able to operate in sequence each of the tools 8, 9 and 10 between respective disengagement positions, wherein they are substantially moved away from the wheel R mounted on the spindle 4, and respective work positions, wherein they are substantially approached to the spindle 4 and are able to contact the tyre P for removing or fitting from/onto the rim C.

Advantageously, these work positions of the tools 8, 9 and 10 are determined depending on the position of the points of incidence of the first and second light beam L1 and L2 on the outer edge of the rim C.

In particular, the first tool 8 is the type of a movable chisel tool and the respective operating assembly 15, 16 and 17 comprise:

a substantially horizontal first arm 15 supporting such first tool 8;
a first system of levers 16 supported by the first carriage 7 and operatively connected to the first arm 15 for the movement of the first tool 8 between the disengagement position and the work position;
a first actuator 17, the type of a linear actuator or the like, able to move the first system of levers 16 between the disengagement position and the work position.

The second tool 9 is the type of a fixed chisel tool and the respective operating assembly 18, 19 and 20 comprise:

a second arm 18 supporting such second tool 9;
a second system of levers 19 supported by the first carriage 7 and operatively connected to the second arm 18 for the movement of the second tool 9 between the disengagement position and the work position;
a second actuator 20, the type of a linear actuator or the like, able to move the second system of levers 19 between the disengagement position and the work position.

Finally, the third tool 10 is the type of a turret tool and the respective operating assembly 21, 22 and 23 comprise:

a third arm 21 supporting such third tool 10;
a third system of levers 22 supported by the first carriage 7 and operatively connected to the third arm 21 for the movement of the third tool 10 between the disengagement position and the work position;
a third actuator 23, the type of a linear actuator or the like, able to move the third system of levers 22 between the disengagement position and the work position.

The first, the second and the third arm 15, 18 and 21 and the first, the second and the third system of levers 16, 19 and 22 are therefore suitably dimensioned and connected so as to allow a correct positioning of the respective first, second and third tool 8, 9 and 10 in the work position, when the respective points of incidence of the first light beam L1 and of the second light beam L2 on the wheel R coincide with respective external points of the upper edge of the rim C.

Furthermore, the machine 1 comprises a first bead breaking tool 24 movably associated with the bearing structure 2 between a disengagement position, wherein it is substantially moved away from the spindle 4, and a bead breaking position, wherein it is substantially approached to the spindle 4 and is able to contact and press a portion of the flank of the tyre P in the proximity of the upper edge of the rim C.

In particular, with reference to the preferred embodiment illustrated in the figures, the bearing structure 2 has a second vertical upright 25, suitably spaced apart from the first upright 6, and the first bead breaking tool 24 is supported by a second carriage 26 associated sliding vertically with the second upright 25.

Advantageously, said bead breaking position is determined by a first locking device 27 for locking the stroke of the first bead breaking tool 24, associated with the tool-holder assembly 5 and operable by the first bead breaking tool itself during the movement from the disengagement position.

According to a preferred but not exclusive embodiment, the first locking device 27 is composed of a first micro-switch fixed to the first carriage 7 which carries the tool-holder assembly 5 and able to lock, once operated, the movement means of the second carriage 26.

In particular, in said work position, the first micro-switch 27 is able to contact a respective first abutment element 28 fixed to the first bead breaking tool 24. Specifically, such first abutment element 28 is composed of a small frame suitably shaped and fixed to the second carriage 26.

Furthermore, the machine 1 comprises a second bead breaking tool 29 movably associated with the bearing structure 2 between:

a disengagement position, wherein it is substantially moved away from the spindle 4;

a bead breaking position, wherein it is substantially approached to the spindle 4 and is able to contact and press a portion of the flank of the tyre P in the proximity of a lower edge of the rim C;

and a tyre removal position, wherein it is arranged just beyond the lower edge of the rim C for the removal of the tyre P from the rim C.

In particular, with reference to the preferred embodiment illustrated in the figures, the second bead breaking tool 29 is supported by a third carriage 30 associated vertically sliding with the second upright 25, below the second carriage 26 which carries the first bead breaking tool 24.

Advantageously, the aforementioned removal position is determined by a second locking device 31 for locking the stroke of the second bead breaking tool 29, associated with the tool-holder assembly 5 and operable by the second bead breaking tool itself during the movement from the disengagement position.

According to a preferred but not exclusive embodiment, the second locking device 31 is composed of a second micro-switch locked together with the first carriage 7 which carries the tool-holder assembly 5 and able to lock, once operated, the movement means of the third carriage 30.

In particular, in the aforementioned removal position, the second micro-switch 31 is able to contact a respective second abutment element 32 locked together with the second bead breaking tool 29. Specifically, such second abutment element 32 is composed of a small frame suitably shaped and fixed to the third carriage 30.

The operation of the machine 1 during the removal operations is described below and is illustrated in figures from 1, 2, 3, 4, 5, 6, 7, 8, 9, 10 and 11.

First, the rim C of a wheel R with the tyre P is fixed by an operator to the spindle 4 (FIG. 1).

Figure 2:
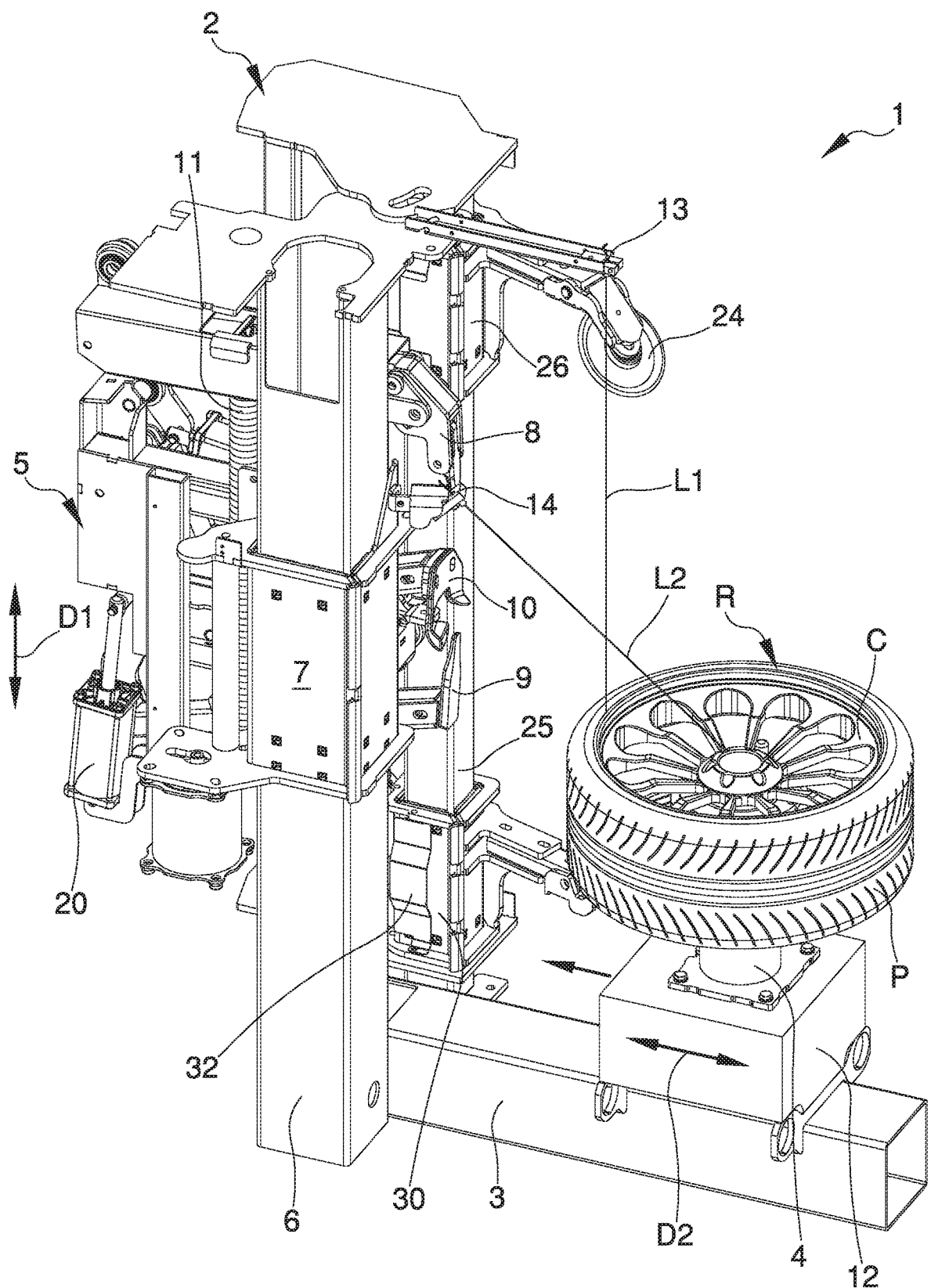

Once the wheel R has been fixed, the spindle 4 is moved along the first horizontal direction D1 close to/away from the tool-holder assembly 5, as far as positioning the point of incidence of the first vertical laser beam L1 at an external point of the upper edge of rim C (FIG. 2).

This positioning enables to find the radius of the rim C of the wheel R and directs and positions all the equipment of machine 1 with respect to this radial measurement.

Figure 3:
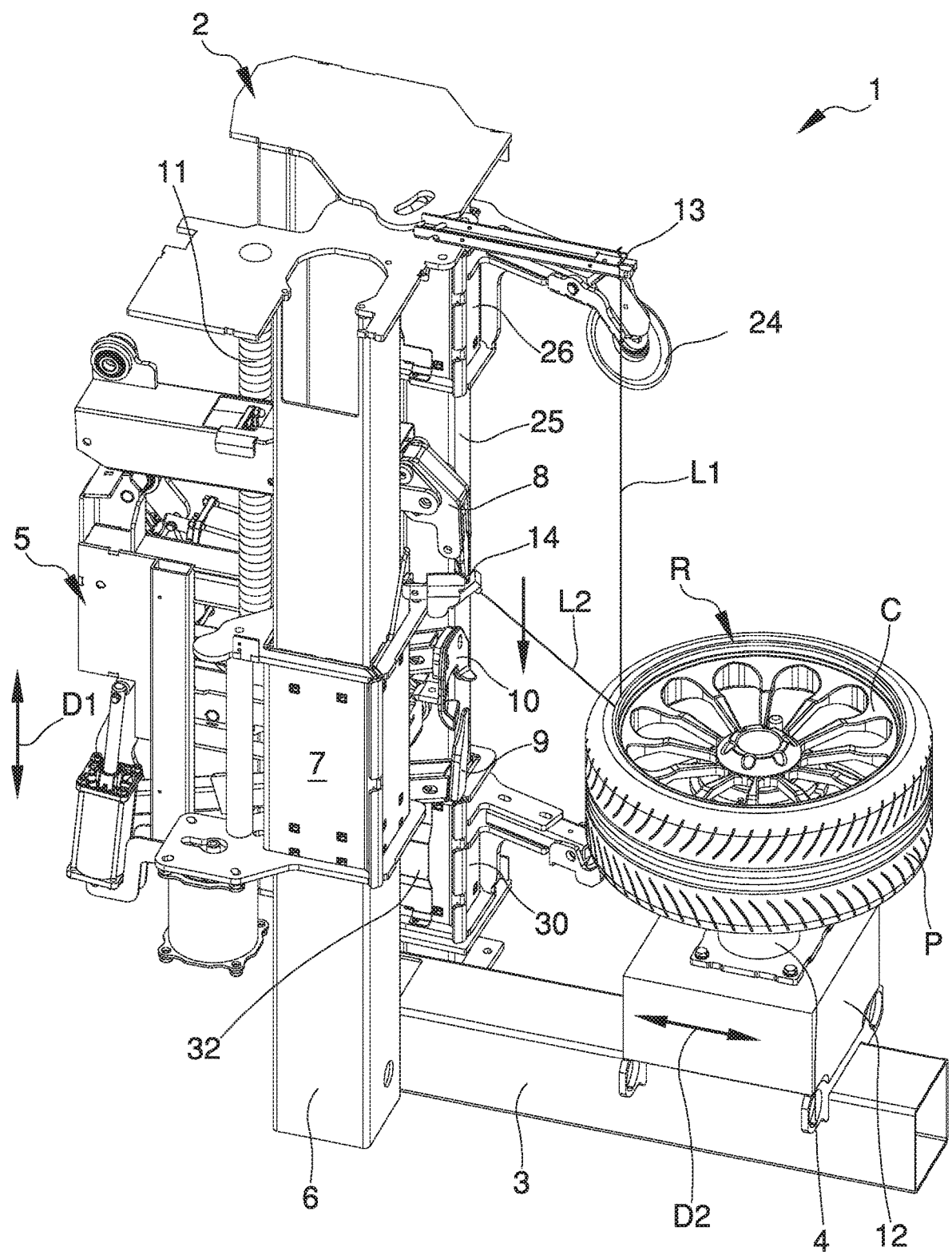

Subsequently, the tool-holder assembly 5 is moved along the second vertical direction D2 close to/away from the spindle 4, as far as positioning the point of incidence of the second inclined laser beam L2 at an external point of the upper edge of rim C (FIG. 3).

This positioning enables to identify the optimum vertical position of the tool-holder assembly 5 and, consequently, the work position of the tools 8, 9 and 10.

Subsequently, the bead of the tyre P is removed at the upper edge of the rim C (FIGS. 4 and 5). In particular, the first bead breaking tool 24 is moved from the disengagement position to the work position, as far as contacting and pressing downwards one portion of the flank of the tyre P. This work position is defined by means of the operation of the first micro-switch 27 which, once operated by means of the contact with the respective first small frame 28, locks the stroke downwards of the first bead breaking tool 24.

The rotation of the wheel R on the spindle 4 thus enables the complete detachment of the bead of the tyre P.

Figure 6:
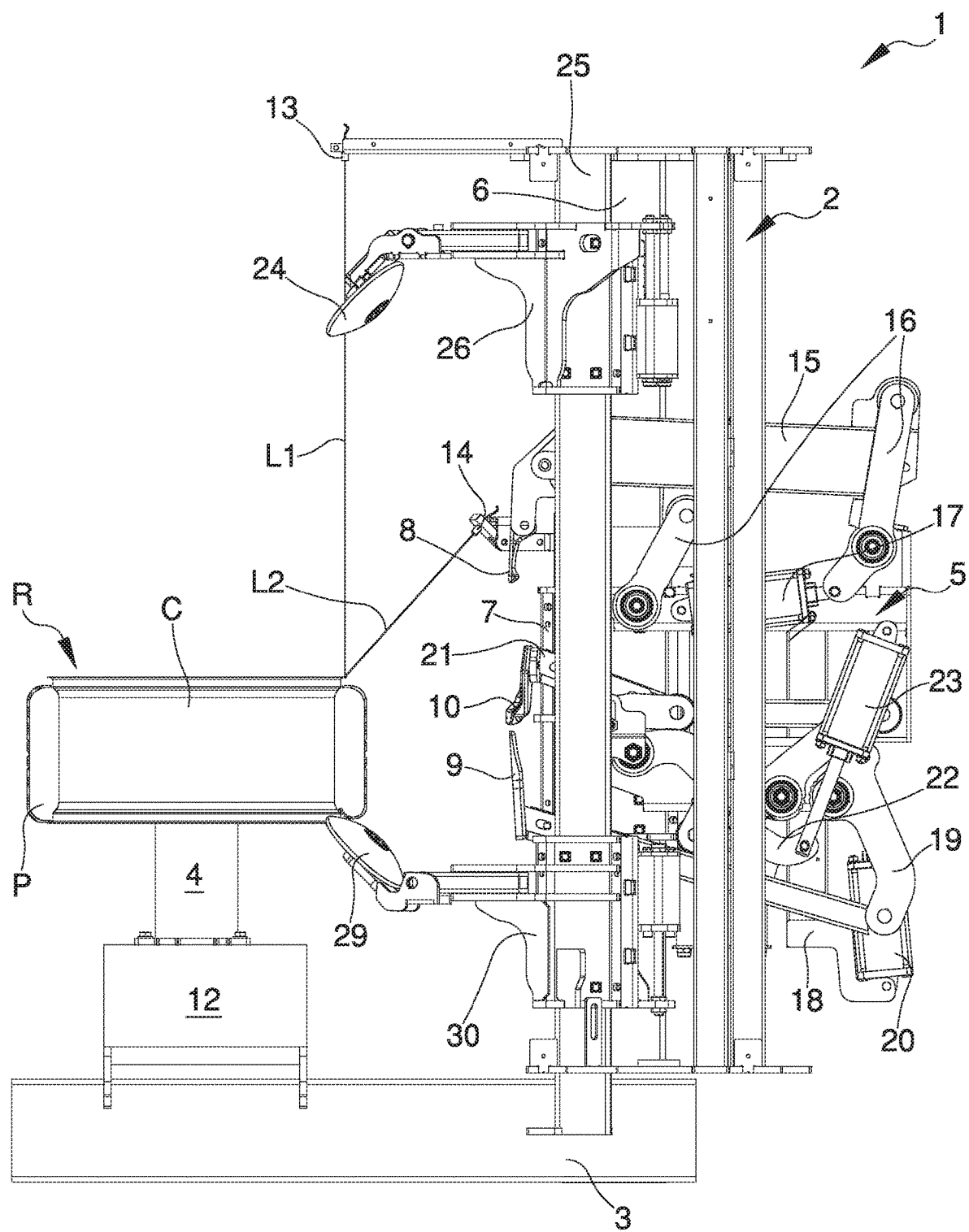

Subsequently, the lower bead of the tyre P is removed by means of the second bead breaking tool 29 (FIG. 6).

Figure 7:
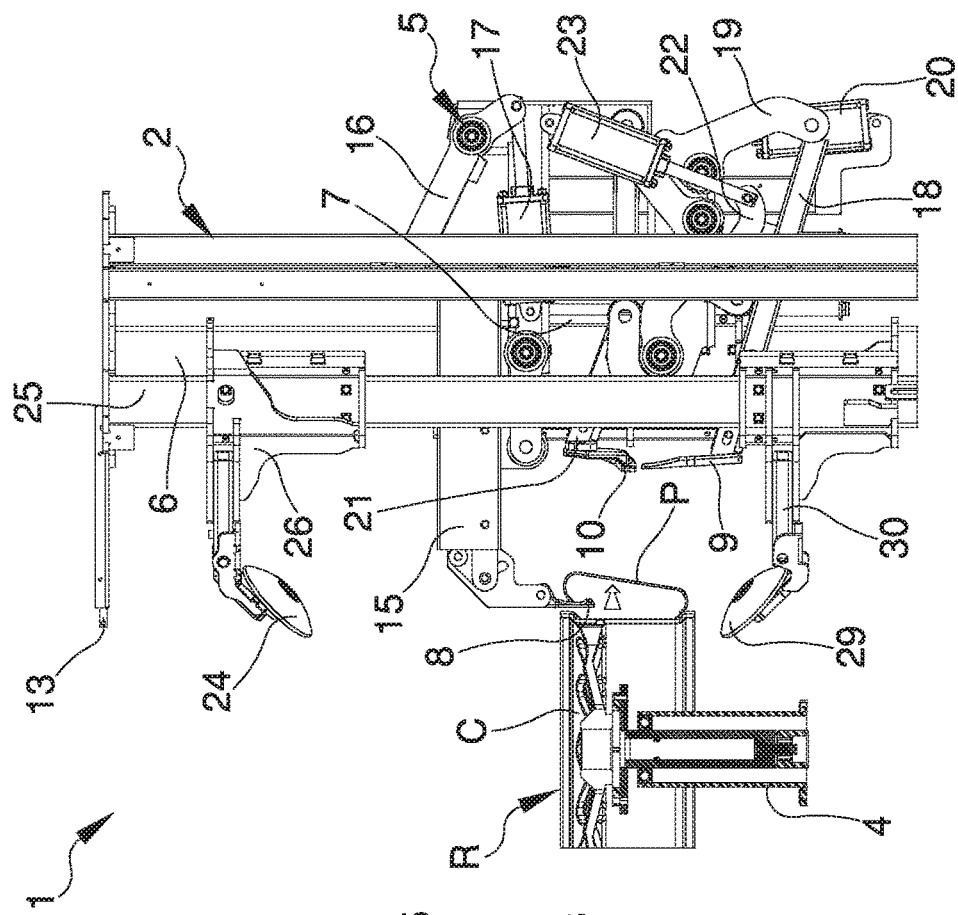
Figure 8:
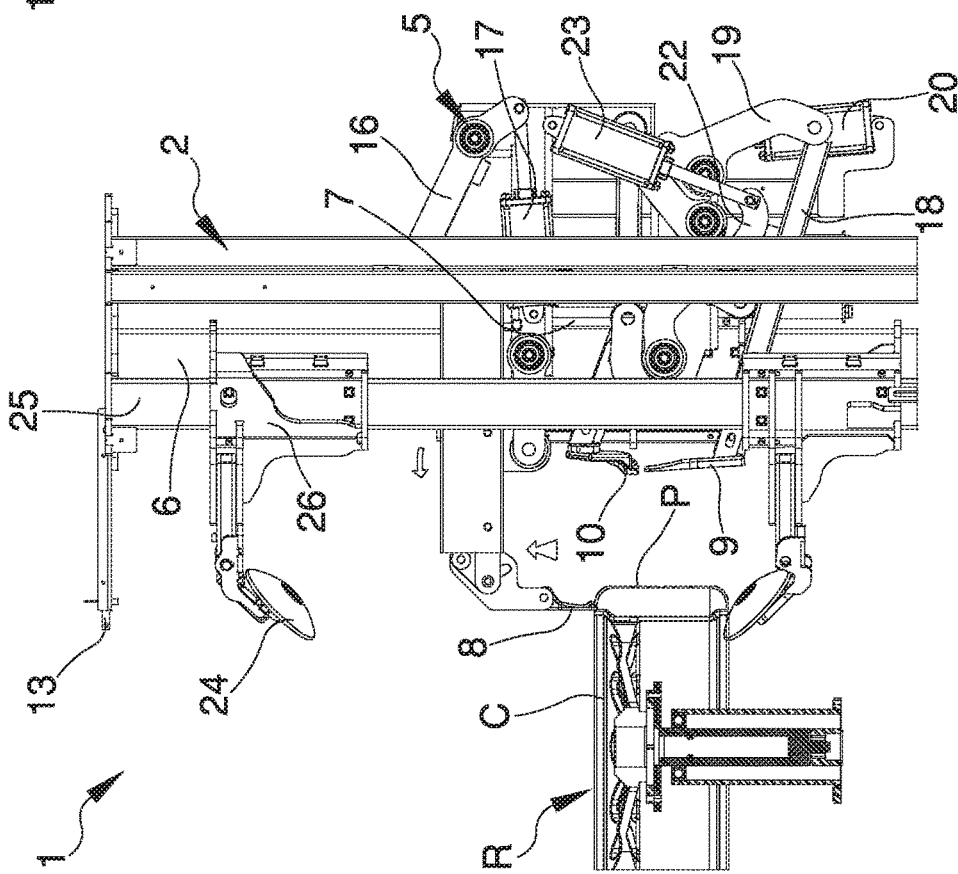
Figure 9:
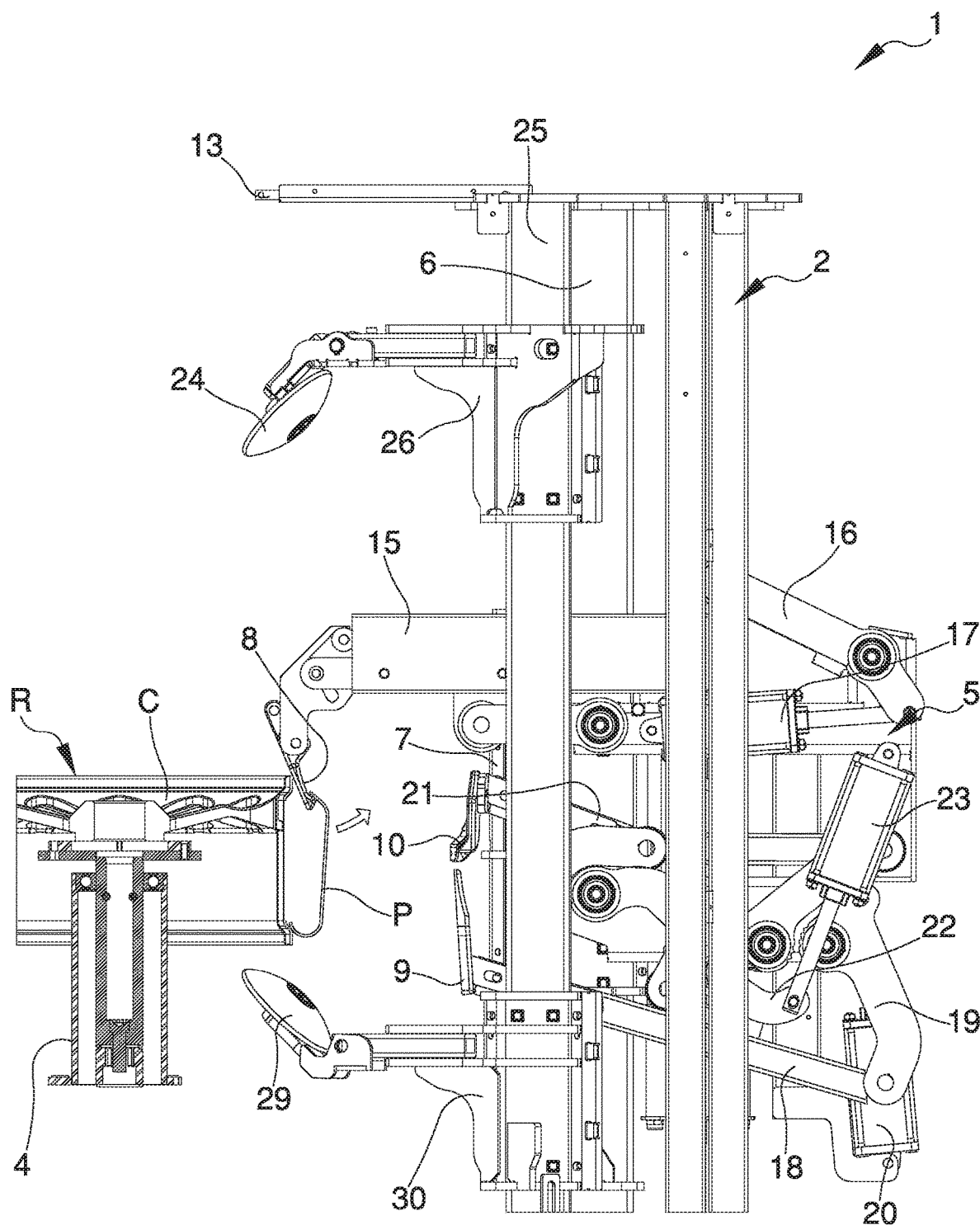

Once the bead breaking of the tyre P has been completed, the first movable chisel tool 8 is operated, which is inserted between the upper edge of the rim C and the tyre, grabs the bead of the tyre P and extracts the bead above the edge of the rim C (FIGS. 7, 8 and 9). In particular, the work position of the first tool 8 is defined by the position of the first laser beam L1 and of the second laser beam L2.

The rotation of the wheel R on the spindle 4 therefore enables the entire bead of the tyre P to be extracted.

To also remove the lower bead of the tyre P from the rim C the second bead breaking tool is then operated, which acts vertically on the tyre P from the bottom to the top as far as the removal position (FIGS. 10 and 11). The height of the second bead breaking tool 29 in the removal position is defined by the second micro-switch 31 which, once operated by means of the contact with the respective second small frame 32, locks the stroke upwards of the second bead breaking tool 29.

Figure 12:
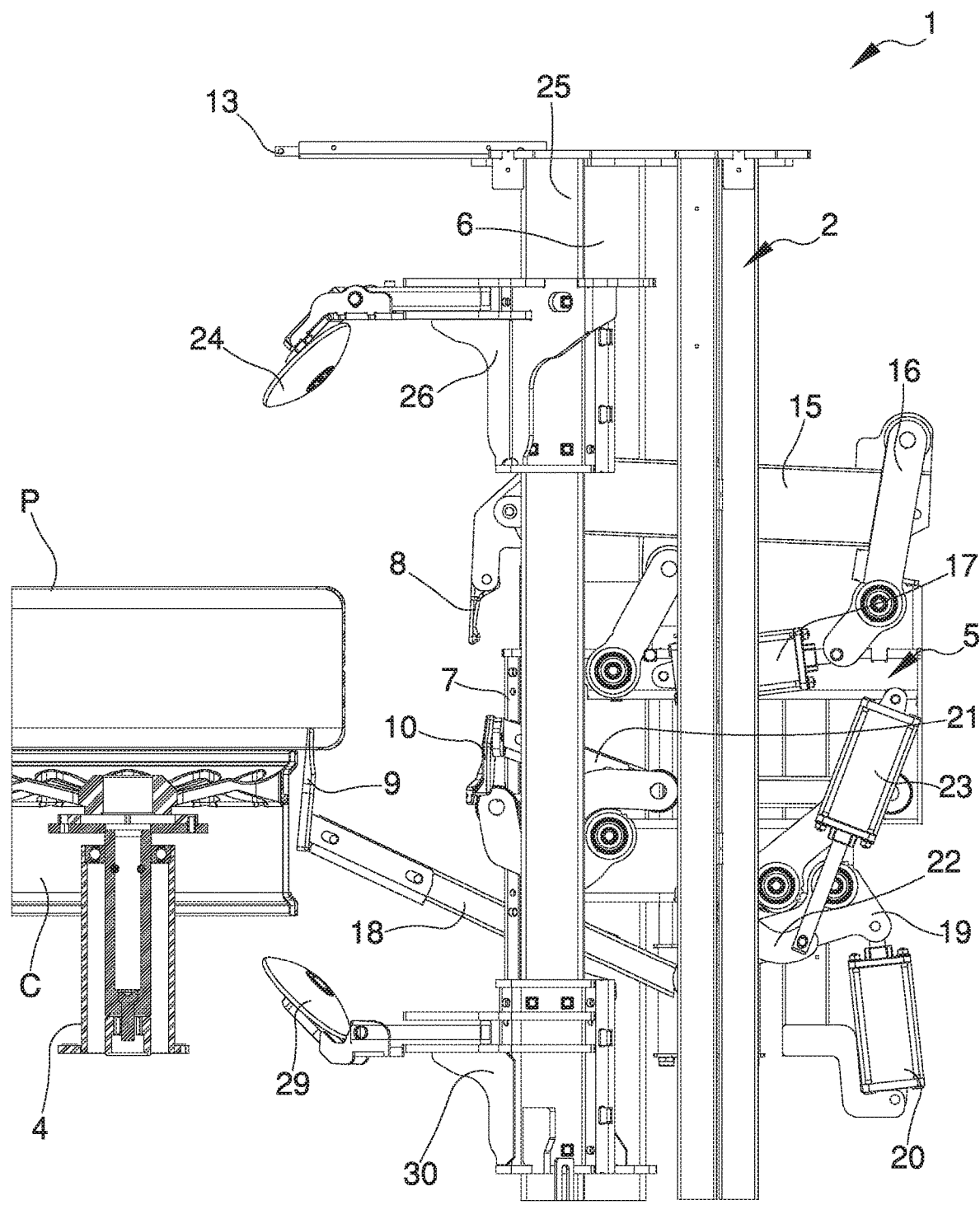
FIGS. 12 and 13 illustrate the operation of the machine according to the invention during an operation of fitting a tyre onto its rim.
Figure 13:
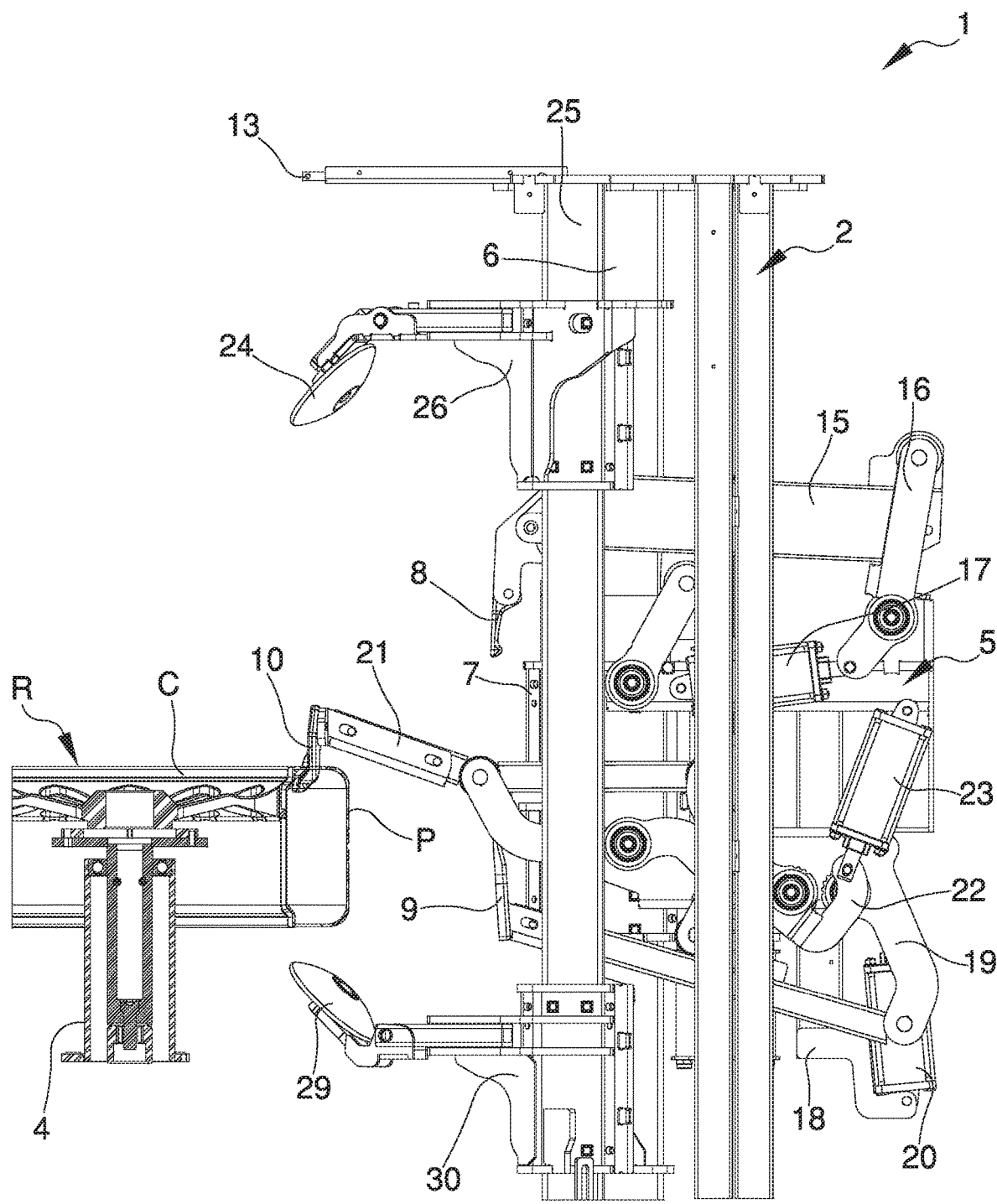

The operation of the machine 1 during the fitting operations is described below and is illustrated in FIGS. 12 and 13.

Similarly to what described above for removal, once the rim C has been fixed onto the spindle 4, the horizontal movement maneuvers of the spindle 4 are carried out together with the vertical movement ones of the tool-holder assembly 5 as far as positioning the first laser beam L1 and the second laser beam L2 at the upper outer edge of the rim C.

Subsequently, the second fixed chisel tool 9 is operated so as to fit the lower bead of the tyre beyond the upper edge of the rim C (FIG. 12). Even in this case, the work position of the second tool 9 is defined by the position of the first laser beam L1 and of the second laser beam L2 with respect to the rim C.

Finally, after having moved the second tool 9 to a disengagement position and in order to fit the upper bead of the tyre P on the first edge of the rim C and complete the fitting this way, the third turret tool is operated, which in the work position presses on the flank of the tyre P (FIG. 13). This work position of the third tool 10 is also defined by the position of the first laser beam L1 and of the second laser beam L2 with respect to the rim C.

It has in practice been observed that the described invention achieves the proposed objects.

In particular the fact is underlined that the machine according to the invention, in particular the presence of the particular visual signaling assembly of the optimal work position, allows to considerably reduce the time required for adjusting the position of the tools depending on the dimensions of the wheel.

Moreover, the machine according to the invention allows to considerably reduce the risk of damaging the rim or the tyre.

It should also be pointed out that the machine according to the invention, in particular the use of the visual signaling assembly, allows to considerably reduce the overall costs compared to solutions that envisage the use of complex control electronics.

Furthermore, such adjustment of the optimal work position being fully mechanical, a greater reliability of the machine is involved, also in the long term and in harsh environments, with respect to a machine driven and adjusted by control electronics.

Finally, the use of the particular visual signaling assembly for the identification of the optimal work position allows a simple and rapid use of the machine, also by not highly qualified personnel.

What is claimed is:

1. A machine (1) for fitting and removing wheel tyres for vehicles, comprising:

a bearing structure (2), an attachment and rotation arrangement (4) for attaching and rotating the rim (C) of a wheel (R) for vehicles, at least a tool-holder assembly (5) movably associated with said bearing structure (2) and having at least a tool (8, 9, 10) for removing and/or fitting a tyre (P) from/onto said rim (C), an adjustment arrangement (11, 12) able to adjust a relative position between said tool-holder assembly (5) and said rim (C), to place said tool-holder assembly (5) in at least an optimal operating position wherein said at least a tool (8, 9, 10) is operable to remove and/or fit a tyre (P), a visual signaling assembly (13, 14) having at least one emitter (13, 14) of a light beam (L1, L2) for providing a basis for identification of the optimal operating position, wherein the at least one emitter (13, 14) comprises a first emitter (13) turned substantially towards said attachment and rotation arrangement (4) and able to emit a first light beam (L1) along a first predefined direction, and a second emitter (14) turned substantially towards said attachment and rotation arrangement (4) and able to emit a second light beam (L2) along a second predefined direction which is a substantially inclined direction, wherein the optimal operating position is visually identifiable when the respective points of incidence of the first light beam (L1) and of the second light beam (L2) on the wheel (R) coincide with respective external points of the upper edge of the rim (C);

wherein said first emitter (13) is locked relative to said bearing structure (2);

wherein said second emitter (14) is locked relative to said tool-holder assembly (5) and is extended at an inclined angle relative to a vertical axis of said bearing structure (2) so as to direct the second light beam (L2) in the second predefined direction;

wherein said tool-holder assembly (5) comprises an operating assembly (15, 16, 17, 18, 19, 20, 21, 22, 23) for operating said at least a tool (8, 9, 10) between a disengagement position, wherein it is substantially moved away from said attachment and rotation arrangement (4), and at least a work position, wherein it is substantially approached to said attachment and rotation arrangement (4) and is able to contact said tyre (P) for removing/fitting from/onto said rim (C), said work position being determined depending on the position of the point of incidence of said at least a light beam (L1, L2) on said wheel (R).

2. The machine (1) according to claim 1, wherein a first direction of the first light beam (L1) is substantially vertical.

3. The machine (1) according to claim 1, wherein said first emitter and second emitter (13, 14) is the type of a laser emitter.

4. The machine (1) according to claim 1, wherein said adjustment arrangement (11, 12) comprises at least a first movement device (12) of said attachment and rotation arrangement (4) along a first direction (D1) of approaching to/moving away from said tool-holder assembly (5).

5. The machine (1) according to claim 4, wherein said adjustment arrangement (11, 12) comprises a second movement device (11) of said tool-holder assembly (5) along a second direction (D2) of approaching to/moving away from said attachment and rotation arrangement (4).

6. The machine (1) according to claim 1, wherein said tool-holder assembly (5) comprises at least a first tool (8) for extracting a bead of said tyre (P) from said rim (C), at least a second tool (9) for fitting a bead of said tyre (P) onto said rim (C), and at least a third tool (10) for fitting said first bead onto said rim (C).

7. The machine (1) according to claim 1, comprising at least a first bead breaking tool (24) movably associated with said bearing structure (2) between a disengagement position, wherein it is substantially moved away from said attachment and rotation arrangement (4), and a bead breaking position, wherein it is substantially approached to said attachment and rotation arrangement (4) and is able to contact and press a portion of the flank of said tyre (P) in the proximity of a first edge of said rim (C), said bead breaking position being determined by locking the stroke of said first bead breaking tool (24) during the movement from said disengagement position.

8. The machine (1) according to claim 7, comprising at least a second bead breaking tool (29) movably associated with said bearing structure (2) between a disengagement position, wherein it is substantially moved away from said attachment and rotation arrangement (4), a bead breaking position, wherein it is substantially approached to said attachment and rotation arrangement (4) and is able to contact and press a portion of the flank of said tyre (P) in the proximity of a second edge of said rim (C), and a removal position of the tyre (P), wherein it is arranged beyond said second edge for removing said tyre (P) from said rim (C), said removal position being determined by locking the stroke of said second bead breaking tool (29) during the movement from said bead breaking position.

9. The machine (1) according to claim 2, wherein the first emitter (13) is extended horizontally outward relative to a vertical axis of said bearing structure (2), so as to direct the first light beam (L1) in the first predefined direction.

10. The machine (1) according to claim 1, wherein the light beam is visible to a human operator, and the optimal operating position is visually identifiable by the human operator.

11. The machine (1) according to claim 1, wherein the operating assembly and the at least a tool comprise:
  a movable chisel tool (8) supported by a substantially horizontal first arm (15), operatively connected to a first system of levers (16), and a first actuator (17) for moving the first system of levers (16) between the disengagement position and the work position;
  a fixed chisel tool (9) supported by as second arm (18) and operatively connected to a second system of levers (19), and a second actuator (20) able to move the second system of levers (19) between the disengagement position and the work position;
  and a turret tool (10) supported by a third arm (21) operatively connected to a third system of levers (22), and a third actuator (23) for moving the third system of levers (22) between the disengagement position and the work position;
  wherein, the first, second and third arms (15, 18, 21), the first, second, and third system of levers (16, 19, 22), and the visual assembly (13, 14) are suitably dimensioned and connected to allow a positioning of the respective first, second and third tools (8, 9, 10) in the work position, when the visual assembly (13, 14) identifies the optimal operating position.

* * * * *